United States Patent
Vantalon et al.

(12) 
(10) Patent No.: US 10,812,846 B1
(45) Date of Patent: Oct. 20, 2020

(54) METHODS AND APPARATUSES FOR A CACHING RECOMMENDATION ENGINE

(71) Applicant: Digital Keystone, Inc., Cupertino, CA (US)

(72) Inventors: Luc Vantalon, Sunnyvale, CA (US); Paolo Siccardo, Los Altos, CA (US)

(73) Assignee: DIGITAL KEYSTONE, INC., Cupertino, CA (US)

(*) Notice: Subject to any disclaimer, the term of this patent is extended or adjusted under 35 U.S.C. 154(b) by 23 days.

(21) Appl. No.: 16/373,750

(22) Filed: Apr. 3, 2019

Related U.S. Application Data (60) Provisional application No. 62/653,375, filed on Apr. 5, 2018.

(51) Int. Cl.
| | |
|---|---|
| G06F 16/435 | (2019.01) |
| G06N 20/00 | (2019.01) |
| H04N 21/2187 | (2011.01) |
| H04N 21/25 | (2011.01) |
| H04L 29/08 | (2006.01) |
| H04N 21/231 | (2011.01) |
| H04N 21/258 | (2011.01) |
| G06F 16/2458 | (2019.01) |

(52) U.S. Cl.
CPC ....... *H04N 21/251* (2013.01); *G06F 16/2465* (2019.01); *G06F 16/435* (2019.01); *G06N 20/00* (2019.01); *H04L 67/2842* (2013.01); *H04N 21/2187* (2013.01); *H04N 21/23106* (2013.01); *H04N 21/25891* (2013.01); *G06F 2216/03* (2013.01)

(58) Field of Classification Search
CPC ............. H04N 21/251; H04N 21/2187; H04N 21/23106; H04N 21/25893; G06F 16/435; G06F 16/2465; G06F 2216/03; G06N 20/00; H04L 67/2842
USPC ........................................................ 725/115
See application file for complete search history.

(56) References Cited

U.S. PATENT DOCUMENTS

| | | | |
|---|---|---|---|
| 2008/0155614 A1* | 6/2008 | Cooper .............. | G06Q 30/0601 725/91 |
| 2016/0028846 A1* | 1/2016 | Coglitore ............ | H04L 67/2842 709/204 |

\* cited by examiner

*Primary Examiner* — Nathan J Flynn
*Assistant Examiner* — Caroline Somera
(74) *Attorney, Agent, or Firm* — Womble Bond Dickinson (US) LLP (57) ABSTRACT

A Caching Recommendation Engine in one embodiment improves the delivery quality of IP services by performing real-time reinforcement learning of the content distribution network behavior, and continuously computing caching recommendations by leveraging novel Artificial Intelligence (AI) techniques to maximize the content distribution network caching efficiency and performance.

22 Claims, 11 Drawing Sheets

METHODS AND APPARATUSES FOR A CACHING RECOMMENDATION ENGINE

This application claims the benefit of priority to U.S. Provisional Patent Application No. 62/653,375, filed Apr. 5, 2018, which application is hereby incorporated herein by reference.

FIELD

At least some embodiments as described herein relate generally to the design and operation of an intelligent repository of live media content for the purpose of further high-quality instant redistribution as on-demand assets.

COPYRIGHT NOTICE

The present description includes material protected by copyrights, such as illustrations of graphical user interface images. The owners of the copyrights, including the assignee, hereby reserve their rights, including copyright, in these materials. The copyright owner has no objection to the facsimile reproduction by anyone of the patent document or the patent disclosure, as it appears in the patent and trademark office file or records, but otherwise reserves all copyrights whatsoever. Copyright Digital Keystone, Inc. 2018.

BACKGROUND

The video distribution industry (broadcast TV and Pay TV including satellite TV, cable TV and Telco TV) is actively transitioning from legacy broadcast distribution to Internet (IP-based) streaming delivery of its video assets.

Certain TV network broadcasters, such as CBS and ABC are offering some of their linear channels over IP as a continuous and unique feed using a Linear Origin. Such streaming content can be accessed for playback in real time or near-real time via a PC browser or via TV-specific services such as Apple TV or Roku, but on-demand, high-quality access is limited.

Certain Pay TV service providers such as Comcast or Cablevision are offering subscribers the ability to store and playback on-demand and live content in the network. On-demand content is stored in general-purpose or dedicated servers, while live content is stored in network-based devices (N-DVR), cloud-based devices (C-DVR) or Live On-demand Origins (LOD). All these can be referred to as "Content Origination Systems" (COS). Such Content Origination Systems are hosted in a public or private cloud and provide the subscriber with capabilities similar to an in-home DVR by recording live events for live, near-live or deferred playback.

Content Origination Systems allow for on-demand access to linear (live TV) content. These systems enable the subscriber to catch up with live events (news, sports, weather), at any time, from the beginning of an event, while the event is still airing, or at any time after the event has ended.

Internet VOD services such as Netflix, Hulu, YouTube, or PBS on Demand and others deliver video clips, movies and TV series episodes over IP, by unicasting multiple VOD sessions originated from copies of a single video file using a VOD Origin. Some of the content can be recorded from live sources and re-purposed for on-demand access via a COS.

Live and on-demand content distribution systems over IP utilize industry standards (such as HLS and DASH) to define media objects that include for each event a media description (i.e. manifests or playlist depending on the delivery standards) that references audio and video media elements (i.e. audio or video fragment or segment depending on the delivery standards) and their associated metadata. An event can represent a past or current TV show episode, a newscast or a movie. Each event can be defined at least by the originating channel (such as the local CBS affiliate broadcast station) and a start and stop time (such as Yesterday from 8 PM to 9 PM PDT).

Many live and on-demand events are delivered with multiple simultaneous audio and video representations, such as video streams at different resolutions, and/or English language as well as Spanish language audio tracks. Certain live and on-demand events can include multiple simultaneous representations that describe different views of the same performance, such as multiple camera angles used in sports and music performances. The multiple representations are delivered simultaneously, and the selection of which representations to be rendered is performed in the player.

PRIOR ART

Prior Art utilized by TV service providers to deliver TV services on-demand over IP includes the design and integration into service of a combination of COS together with Content Delivery Network (CDN) systems. These systems implement caching at multiple locations in the distribution network for the purpose of storing commonly requested media objects.

A subscriber's initial media object playback request is forwarded to the COS by the CDN. The identified media object is delivered to the subscriber by the CDN and a copy is cached according to the caching instructions returned to the CDN by the COS along with the media object itself. The caching instruction defines for how long the media object should be stored in the CDN. Subsequent requests for the same media object are delivered directly from the CDN cache, without the need for any new requests to the COS, thus reducing the traffic load on the COS and increasing the overall efficiency of the distribution.

In a content delivery system, media descriptions and media elements of a live or on-demand event are delivered to a CDN by a COS. The COS enable subscribers to catch up with live and recorded events (news, sports, weather), at any time, from the beginning. However, these very dynamic, very large origins present a completely new challenge for the CDN. Existing live-only Linear Origins request a CDN to cache content only for a few seconds, and this is easily handled by a CDN. VOD Origins present a static catalog where most of the content remains the same over long periods of time and therefore most content playback requests to the CDN are for content that is already in the CDN cache. On the other hand, COS that store live TV events have a tendency to saturate their downstream CDN by recommending more caching that the CDN can sustain, and by offering a content catalog that is constantly updated with new live events. As a result, the CDN is regularly forced to flush random valid content from its cache to make room for always new content playback requests. Constant flushing introduces additional pressure to the delivery path upon deleting, and constant new playback introduces additional pressure each time the media objects need to be fetched again from the origin.

U.S. Pat. No. 9,819,972 defines a novel Live On Demand (LOD) Origin architecture that enables the provision, operation and management of massively scalable, highly efficient, high availability COS that offer random access to linear feeds without playback restrictions, supporting live, near-live, catch-up, start-over and on-demand access modes regardless of the origin, network and player limitations.

If among others, the architecture in U.S. Pat. No. 9,819,972 resolves the constraints of the limited storage capacity of the COS by providing means for unbounded scalability, it does not directly address the consequence of the limited capacity of the downstream CDN. Due to the finite size of the CDN caching capacity, it is good practice for the origin to attempt to limit the amount of CDN caching by setting an expiration time for each media object, usually by defining the value of a "maximum age" parameter. This value can be constrained by the business requirements set upon publishing each event. As an example, for an event that is published for one week, the origin may set the expiration time of each media object up to one week. The CDN uses this expiration value in a "best effort" mode, to decide when to delete a media object from its cache to make room for new media object requests. In ideal circumstances, the CDN will keep each media object in its cache until the expiration time for that object is reached.

If the expiration time of media objects is set too high in aggregate (so content is cached for too long), the CDN reaches its maximum capacity and starts to randomly delete media objects, including some that will be requested again by one or more client devices. If the expiration time of an asset representation is set too low (so content is cached for too short a period of time), the corresponding media objects will expire and would need to be requested again in their entirety in case that asset representation continues to be requested by one or more client devices.

It is desirable to run a CDN at or near its storage capacity in order to achieve maximum utilization of its resources. However, due to the high utilization and the finite storage capacity, the CDN may be forced to flush its cache by prematurely deleting some media objects that it was instructed to keep for a longer period, just to make room for new playback requests for other media objects. Upon any subsequent request of the prematurely deleted media object, the CDN will treat it as an initial request, it will fetch the requested content again from the origin and it will store it again in the cache, likely resulting in the premature deletion of another media object. These premature CDN cache flushes and subsequent cache misses don't necessarily result directly into a playback failure, as any prematurely deleted media objects remain available in the COS and if they were to be requested again by a client device, the CDN would be able to fetch, cache and deliver the original media object again and again. However, multiple cache misses due to premature cache flushes are the symptoms of a system behavior that goes against the CDN objective of an optimized and efficient content delivery.

A CDN is inefficient at flushing its non-expired content after it reaches its capacity threshold for multiple reasons:
  The task of freeing storage capacity is a time-critical operation of the CDN that diverts computing, memory and disk resources from the primary objective of serving content requests.
  The selection of the media objects to be deleted, is at best based on a limited demand history for the object, without taking into account the probability of future use.
  Media object delete decisions are made without taking into account the fact that such object is part of a larger event and it is preceded and succeeded by other objects. Randomly deleting one or more portion of an event results on following different distribution sequences over time, which creates additional network instability and potential player confusion.

A CDN is very efficient at discarding and refreshing content that has expired for multiple reasons:
  The task of removing expired content is a background maintenance operation that can be done periodically without pre-condition and at a low priority.
  The CDN is a slave of the COS that set the caching expiration time and doesn't need to make a decision on its own in real-time on which media objects need to be deleted first.

SUMMARY OF THE DESCRIPTION

The definition and the implementation of a Caching Recommendation Engine (CRE), capable of learning the CDN behavior and of adaptively reducing or minimizing the number of premature CDN cache flushes followed by cache misses, while increasing or maximizing its caching performance and efficiency, is addressed by embodiments of the present invention. The embodiments of the invention provide innovative methods and apparatuses to automatically compute and continuously adjust the individual caching expiration values per-event and per-representation in order to maximize the performance and efficiency of the CDN.

The objective of a CRE in one embodiment is to continuously adjust the expiration time (e.g., a time-to-live (TTL)) of the currently delivered media elements based on continuous learning of the rolling CDN behavior to improve the utilization efficiency or maximize the value of the caching capacity of the CDN in the future.

In one embodiment of the invention, the selection of the best caching options for each channel representation is calculated from a state that represents one week of compiled demand for media elements that were recorded and first delivered exactly a week ago.

In one embodiment, a CRE makes no assumption on the characteristics of the CDN or the COS. An embodiment of a CRE can leverage novel Artificial Intelligence (AI) and optimized Control Theory (CT) approaches, upon real time data mining to finely tune the behavior of out-of-reach downstream components to attempt to always perform at their optimal point.

In one embodiment, the reinforced learning of the CDN behavior is a continuous task that leads to the definition of a single system state, in order to fulfill the Markov Property.

In another embodiment, the CRE learns the behavior of the downstream CDN by profiling by event, by representation, and by time, the secondary requests made to a COS for media objects that have been already cached by the CDN and either prematurely flushed or expired. The profiling data can be aggregated periodically over a Collection Interval (e.g., 10 minutes) that is generally set to be shorter than the duration of an event (which may be 60 minutes or longer).

In another embodiment, the CRE utilized the media request profile history over an Analytic Period that is selected based on the likelihood of repeated CDN and player request patterns. As an example, by setting the Analytic Period to one week, the CRE will take into account the request profiles for weekly and daily repeating events. Knowing when to set the expiration can also be dependent on understanding the consumption pattern of each particular event in one embodiment. For example, a daily night event, which airs from 11 pm to midnight on a popular channel will mostly have some live requests, minimum demand during the night but some new requests catching up during the commute hours. A weekly event (e.g. an event every Monday night during football season) will mostly have many requests that span several days after the show airs. By comparison, a morning newscast would only be watched only until the noon newscast starts to be available. In one embodiment, the caching recommendations from a CRE can take these consumption patterns into account and use them as, for example, default caching recommendations until the actual event profile is learned from the CDN's behavior over time, or use them in generating new caching recommendations.

In another embodiment, the COS is a LOD as described in U.S. Pat. No. 9,819,972 which is incorporated by reference herein.

In another embodiment of the invention, the Caching Recommendation Engine operates without any CDN.

In one embodiment, the CRE continuously collects the request profile of each event for each collection interval, and utilizes the collected profiles, aggregated over an entire Analytic Period, to determine a better cache value to be used for that event by the CDN going forward, with a process that repeats indefinitely in order to continuously adapt to varying demand patterns and varying CDN performance.

The embodiments described herein include methods for operating a Caching Recommendation Engine on one or more servers, data processing systems that implement one or more servers, and non-transitory computer readable medium or media that store executable program instructions which when executed by a data processing system (such as one or more servers) cause the data processing system to perform one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF DRAWINGS

The embodiments as described herein are illustrated by way of example and not limitation in the figures of the accompanying drawings in which like references indicate similar elements.

DETAILED DESCRIPTION

The embodiments will be described with references to numerous details set forth below, and the accompanying drawings. The following description and drawings are illustrative of the embodiments and are not to be construed as limiting. Numerous specific details are described to provide a thorough understanding of the embodiments as described herein. However, in certain instances, well known or conventional details are not described in order to not unnecessarily obscure the embodiments in detail.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Figure 1:
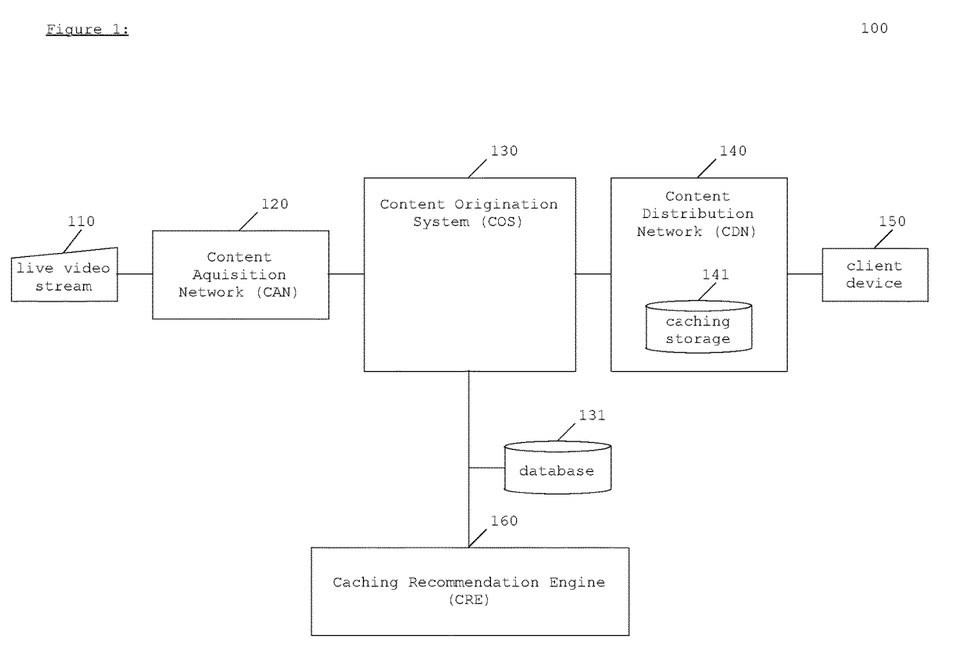
FIG. 1 shows a block diagram illustrating an exemplary embodiment of a CRE connected with a COS.

FIG. 1 shows a block diagram 100 illustrating an exemplary embodiment of a CRE 160 connected with a COS 130. Origin 130 continuously ingests one or more live video streams 110, through one or more Content Acquisition Networks (CAN) 120 that are coupled to one or more live video streams 110. One or more client devices (such as client device 150) request media elements from a CDN 140. If the content is not available within the CDN caching storage 141, it is further requested from origin 130, which fetches it from its database storage 131. The origin 130 is connected to a CRE 160 responsible for profiling the CDN behavior and making individual caching suggestions for the currently delivered media elements that intend to improve the delivery efficiency and the quality of the experience. In one embodiment of the invention, a database 131 is maintained by the COS and made available to the CRE for access to the CRE. In another embodiment, the database 131 is shared between the COS and the CRE. In another embodiment of the invention, the database 131 is maintained by the CRE and made available to the COS for access.

Figure 2:
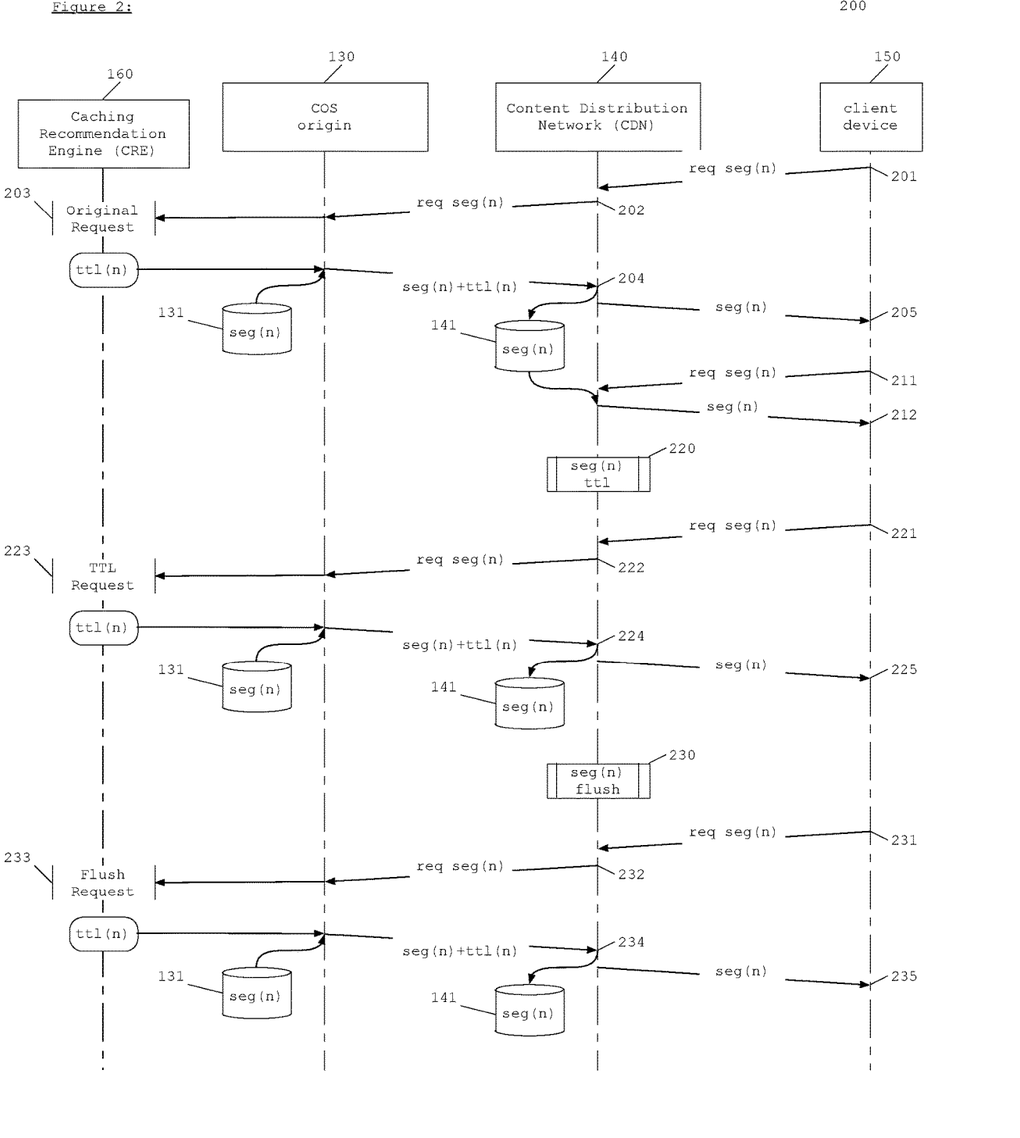
FIG. 2 details a flowchart of the transactions processed by an exemplary embodiment of a CRE.

FIG. 2 details a flowchart 200 of the transactions processed by an exemplary embodiment of a CRE 160 connected to a COS 130. A client device 150 issues transaction 201 to request a specific media element for a channel representation seg(n) 201 from a CDN 140. As request 201 was never placed to the CDN 140 before, the CDN could not have cached the media element yet, so it issues a subsequent request 202 to origin 130. CRE 160 qualifies the request as Original Request 203 and provides a recommended expiration time (e.g. ttl(n)). COS 130 responds to the CDN 140 with transaction 204 that includes seg(n) and a caching instruction ttl(n). CDN 140 records the media element into its caching storage 141 according to the caching instruction and responds to client 150 with transaction 205. In one embodiment, an event can be a show or program or other content on a channel that has at least a start time on a day of the week. An event can be defined by a channel and a start time and a stop. For example, a show can be defined by its channel (e.g. CBS) and start time (e.g. 7 p.m.) and its stop time (e.g. 7:30 p.m.). An event can be a live event that can be recorded and broadcast concurrently (at substantially the same time), such as "Saturday Night Live". Moreover, each event can be broadcast concurrently in a plurality of different representations such as different bit rates of transmission, different quality or format levels such as standard definition and high definition, etc.

In one embodiment, the event can be delivered as streaming media through HTTP compliant processes and systems such as processes and systems using the Dynamic Adaptive Streaming over HTTP (DASH) standard (such as ISO/IEC 23009-1) or the Apple HLS (HTTP Live Streaming) system. In an embodiment that uses DASH or HLS, the event is delivered by transmitting small segments of the entire event (e.g. segments that are each about 10 seconds in duration), and these small segments can be considered media elements that are described by playlists that client devices use to request the media elements.

In one embodiment of the invention, the CRE registers more than one Original Media Element requests per media description representation, when these requests come together within a short time interval. This scenario remains very frequent when the CDN includes multiple independent mid-tier servers.

In transaction 211, the same or a different client 150 asks for the same media element as transaction 201. Because seg(n) has been previously cached by the CDN 140 in caching storage 141, transaction 212 is returned without requiring a round trip to origin 130 by sending the media element from caching storage 141.

CDN 140 expires seg(n) after ttl(n) 220. When the same or a different client 150 asks for seg(n) again 221, CDN 140 goes back to origin 130 with transaction 222, as the media element is no longer available from storage 141. CRE 160 qualifies the request 221 as TTL Request 223, because the request is coming after media element time+ttl(n). Transaction 224 is returned with the same parameters as transaction 204. CDN 140 re-caches seg(n) for the duration of ttl(n) and delivers to the client seg(n) via transaction 225.

Figure 3:
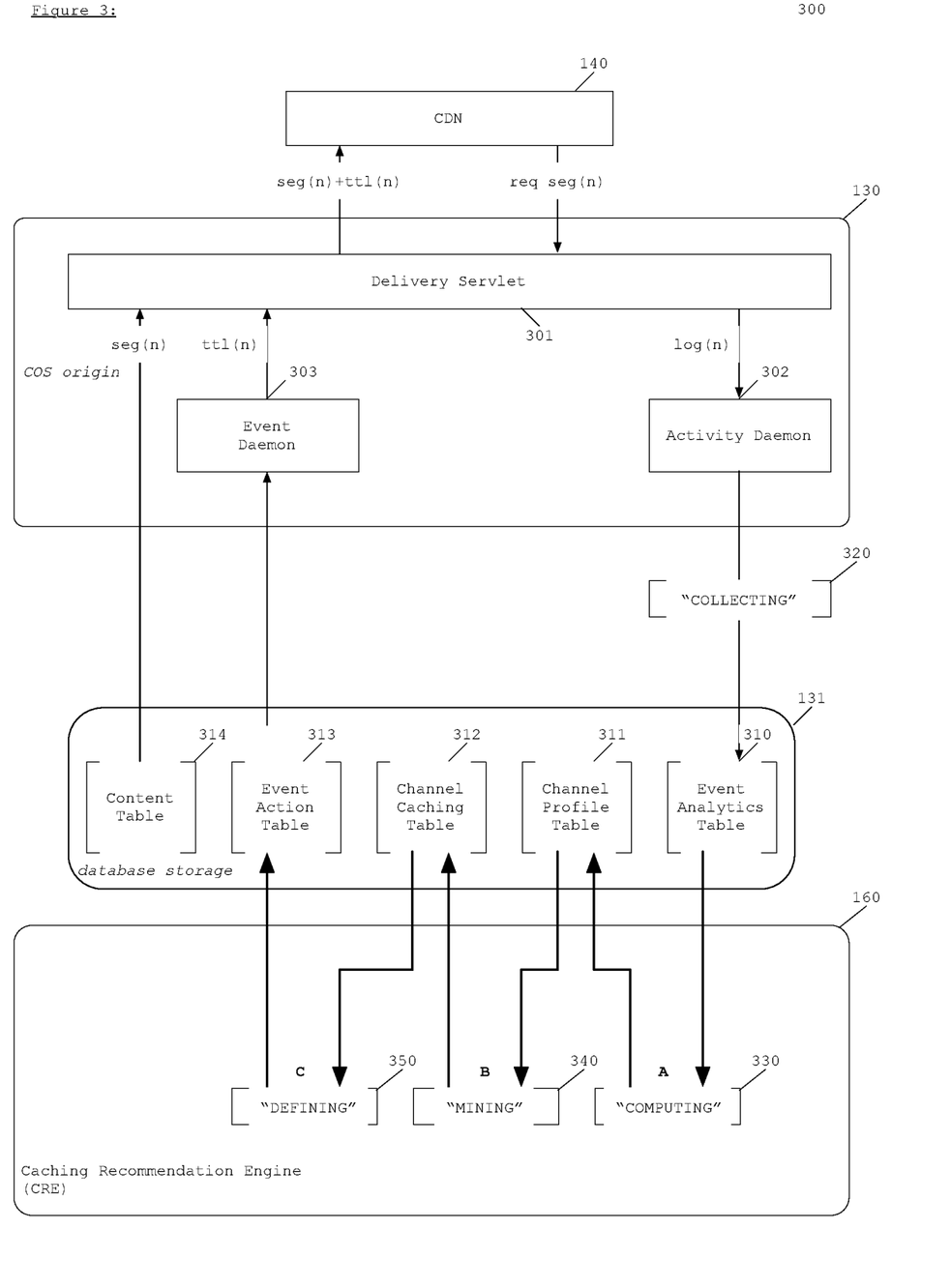
FIG. 3 shows a block diagram representing the main functions of an exemplary embodiment of a CRE.

In the example shown in FIG. 3, CDN 140 flushes seg(n) 230 before the media element expires to free some space in its caching storage. When the same or a different client 150 asks for seg(n) again 231, CDN 140 goes back to COS 130 with transaction 232, as the media element is no longer available from storage 141. CRE 160 qualifies the request as Flush Request 233, because the request is coming after the interval of the Original Request and before media element time+ttl(n). Transaction 234 is returned with the same parameters as transaction 204. CDN 140 re-caches seg(n) for the duration of ttl(n) and delivers to the client seg(n) via transaction 235.

In one embodiment of the invention, ttl(n) is further adjusted so seg(n) in storage 141 never outlives seg(n) in storage 131.

FIG. 3 shows a block diagram 300 representing the main functions of an exemplary embodiment of a Caching Recommendation Engine 160 connected with a COS 130. CDN 140 initiates a media element request for seg(n) that is processed by a Delivery Servlet 301. The response sequence in one embodiment includes fetching seg(n) from a Content Table 314 of the database storage 131, fetching ttl(n) from an Event Daemon 303, recording log(n) to an activity Daemon 302 and delivering the payload to CDN 140.

Event Daemon 303 can be, in one embodiment, a standalone process that continuously queries an Event Action Table 313 to maintain in memory a current set of delivery actions for all events that have been published in the system. In one embodiment of the invention, one delivery action for an event is the definition of a caching value for one of its representations. Activity Daemon 302 can be, in one embodiment, a standalone process that aggregates all delivery transactions for a sampling time interval to batch write them in an Event Analytics Table 310. In one embodiment of the invention, a delivery transaction includes when a media element has been issued, when it has been delivered and with what expiration time.

CRE 160 in one embodiment is responsible for mining the data of Event Analytics Table 310, to write recommended caching actions to Event Action Table 313. The CRE 160 operation includes in one embodiment operations A (Computing 330), B (Mining 340) and C (Defining 350).

In one embodiment of the invention, operation A (Computing 330) corresponds to CRE 160 performing a batch read of analytics data that are event specific, per server and indexed to media element delivery time, to update a Channel Profile Table 311 with data that are channel and representation specific, aggregated across all servers, and indexed to media element issue time. In another aspect of the embodiment, operation A is performed as a micro batch map & reduce operation, where each server of the origin 130 is focusing only on the channels that it is currently ingesting. These batches are sequenced periodically, but not more often than the aggregation interval of Activity Daemon 302 in one embodiment. In another aspect of the invention, the channel data of table 311 are not modified after the event data of table 310 have expired.

In one embodiment of the invention, operation B (Mining 340) corresponds to CRE 160 performing a batch read of the profile data of Channel Profile Table 311 to aggregate the state of each channel representation for the profiled window and to define the recommended caching instructions that will result in improved or the best use of the CDN caching capacity, by solving the Bellman equation of the Markov Decision Process. In one embodiment of the invention, the Bellman equation is resolved adaptively by adjusting the caching values issued at the beginning of the profiled window, based on the reward gathered during the overall availability window. In another aspect of the embodiment, operation B decreases the amount of total recommended caching hours, if a high level of premature CDN flushes has been detected. In another aspect of the embodiment, operation B increases the caching recommendation for the channel representations that have shown a high level of demand post expiration. In another aspect of the embodiment, the unit of increment and decrement used by the algorithm in operation B corresponds to the granularity (in time) of the data recorded in table 311.

In one embodiment of the invention, the profiled window is set to one week to capture the periodicity of both daily and weekly consumption patterns. In another aspect of the invention, the recommended caching instructions are written to a Channel Caching Table 312 indexed by channel representation. In another aspect of the invention, the data of table 311 are deleted past the profiled window. These batches are sequenced periodically, but not more often than the batch interval of operation B. In one embodiment of the invention, the data of table 312 are updated at every collection interval.

In one embodiment of the invention, operation C (Defining 350) corresponds to CRE 160 performing a batch read of the recommendation data of Channel Caching Table 312 to create one or more caching actions for the active published events of table 313. An active published event is an event that is currently airing. There could be as many caching actions as there are representations for an event. These caching actions are sequenced periodically in one embodiment, but not more often than the computation interval of operation B. In one aspect of the embodiment, the caching action of an event stops to be updated by operation C after the event has turned inactive.

Figure 4:
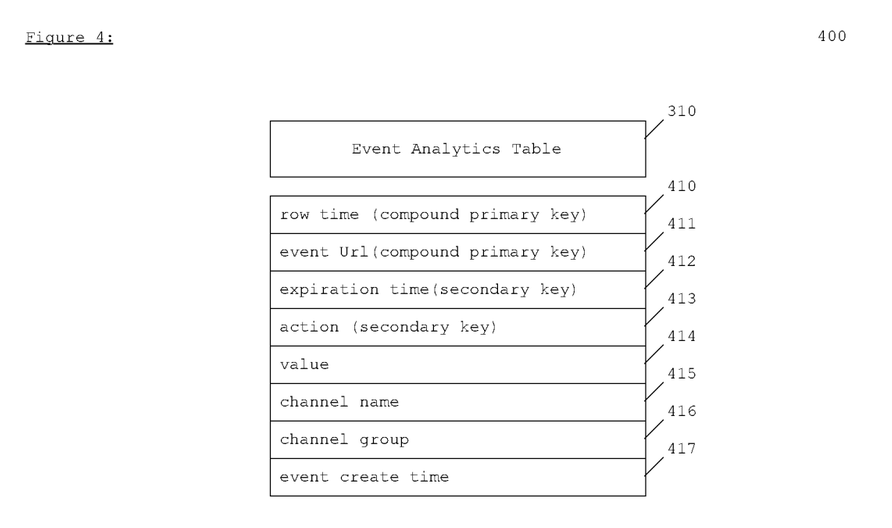
FIG. 4 shows a block diagram representing an exemplary embodiment of a database table capable of storing the analytics data of a published event.

FIG. 4 shows a block diagram 400 representing an exemplary embodiment of a database Event Analytics Table 310, designed to store the analytics data of a published event. Table 310 has a compounded primary key based of row time 410, which changed periodically and event URL 411, which uniquely identify an event. In one aspect of the embodiment, row time changes every new day for the purpose of spreading (e.g. load balancing for storage) the table rows on a maximum of servers. Table 310 has secondary key expiration time 412 and action 413 to facilitate the retrieval of the data. In one embodiment of the invention, an event could have its expiration time updated. Other fields include value 414 to store the parameters of the action, and also include channel name 415 and channel group 416 to avoid joining tables upon query in a "shared nothing" NoSQL database environment and event create time 417 for versioning purposes.

In one aspect of the embodiment, the event analytics data are stored in table 310 as object and value pair, where object is defined as keyword "_delivery", followed by the analytics interval start time and the server IP address, and data is a string including count, status and performance of manifests and media element responses. In another aspect of the embodiment, media element responses are qualified in term of media element delay, whereas a media element delay is the time between when a media element is issued and when it is delivered. In another aspect of the embodiment, media element responses include the duration of the media element itself and its size.

Figure 5:
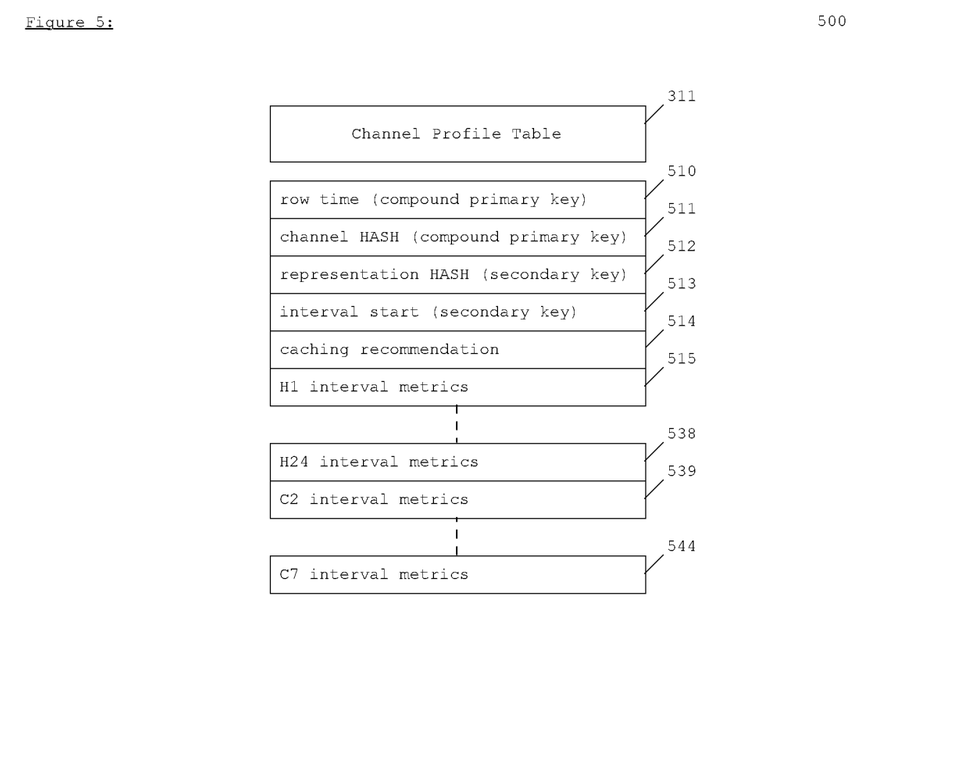
FIG. 5 shows a block diagram representing an exemplary embodiment of a database table, capable of storing the CDN behavior for the channel representations over time.

FIG. 5 shows a block diagram 500 representing an exemplary embodiment of a database Channel Profile Table 311, designed to store the CDN behavior for the channel representations over time. Table 311 in one embodiment has a compounded primary key based on row time 510, which changed periodically and channel HASH 511, which uniquely identifies a channel. In one aspect of the embodiment, row time changes every day for the purpose of spreading the table rows on a maximum of servers. Table 311 in one embodiment has secondary key representation HASH 512 and interval start 513 to facilitate the retrieval of the data. In one embodiment of the invention, the interval start changes every new hour. In one aspect of the embodiment, table 311 includes the past caching recommendation 514 of CRE 160 applicable to the row media elements, which consists of all the media elements issued from interval start to interval start plus one hour. H1-23 columns 515-537 and C2-C7 columns 538-543 include the metrics that describe the consumption by the CDN of the channel representation media elements for the row. For example, in column 515 the metrics includes the characterization of the requests for the row media elements during their first hour, in column 537 during their twenty fourth hour, in column 538 during their second day and in column 543 during their seventh day. In one aspect of the embodiment, the metrics includes the number and characterization of the requests as Original Request, TTL Request or Flush Request, and their size.

Figure 6:
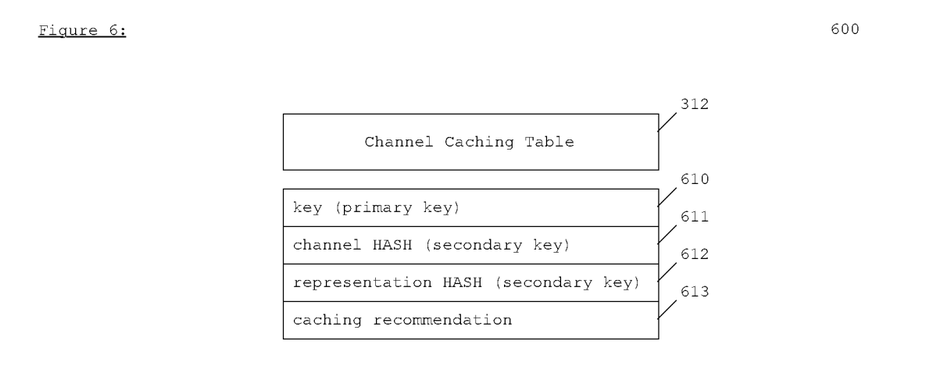
FIG. 6 defines an exemplary embodiment of a database table capable of storing the recommended CDN expiration time of a channel representation over time.

FIG. 6 shows a block diagram 600 representing an exemplary embodiment of a database Channel Caching Table 312, designed to store the actual caching recommendation for each channel representation. Table 312 in one embodiment has a static primary key 610 to locate all data on a single row. Table 312 has secondary key channel HASH 611 and representation HASH 612 to facilitate the retrieval of the data. In one aspect of the embodiment, table 312 includes the actual recommended caching duration 613 for the new channel representation media elements.

Figure 7:
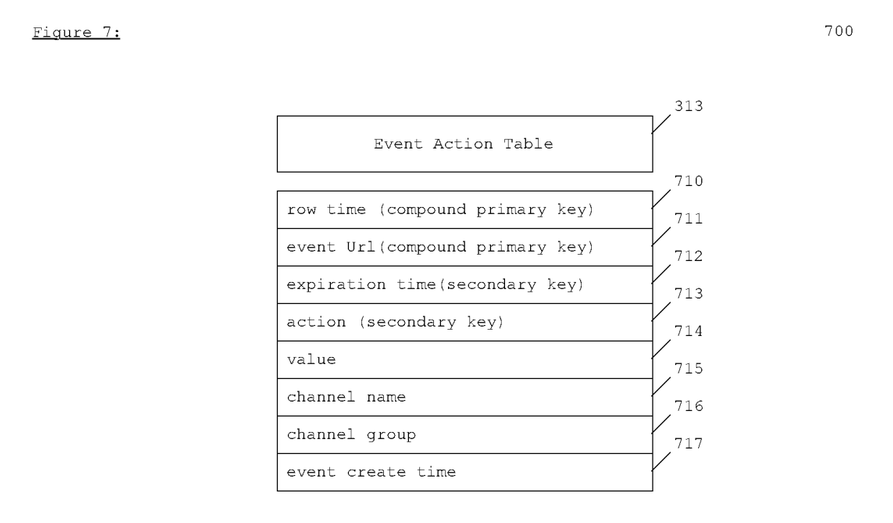
FIG. 7 defines an exemplary embodiment of a database table capable of storing the current recommended CDN expiration time of an event.

FIG. 7 shows a block diagram 700 representing an exemplary embodiment of a database Event Action Table 313, designed to store the current action caching recommendation for each channel representation. Table 313 has a compounded primary key based of row time 710, which changes periodically and event URL 711, which uniquely identifies an event. In one aspect of the embodiment, row time changes every new day for the purpose of spreading the table rows on a maximum of servers. Table 313 has secondary key expiration time 712 and action 713 to facilitate the retrieval of the data. In one embodiment of the invention, an event could have its expiration time updated. Other fields include value 714 to store the parameters of the action, channel name 715 and channel group 716 to avoid joining table upon query in a shared nothing NoSQL database environment and event create time 717 for versioning purpose. In one aspect of the embodiment, table 310 and table 313 share the same schema to facilitate table merging when publishing a detailed description of the event.

In one aspect of the embodiment, the event action data are stored in table 313 as object and value pair, where object is defined as keyword "_caching", followed by the representation HASH, and data the recommended time in hour, the media element should be kept by the CDN before it expired.

Figure 8:
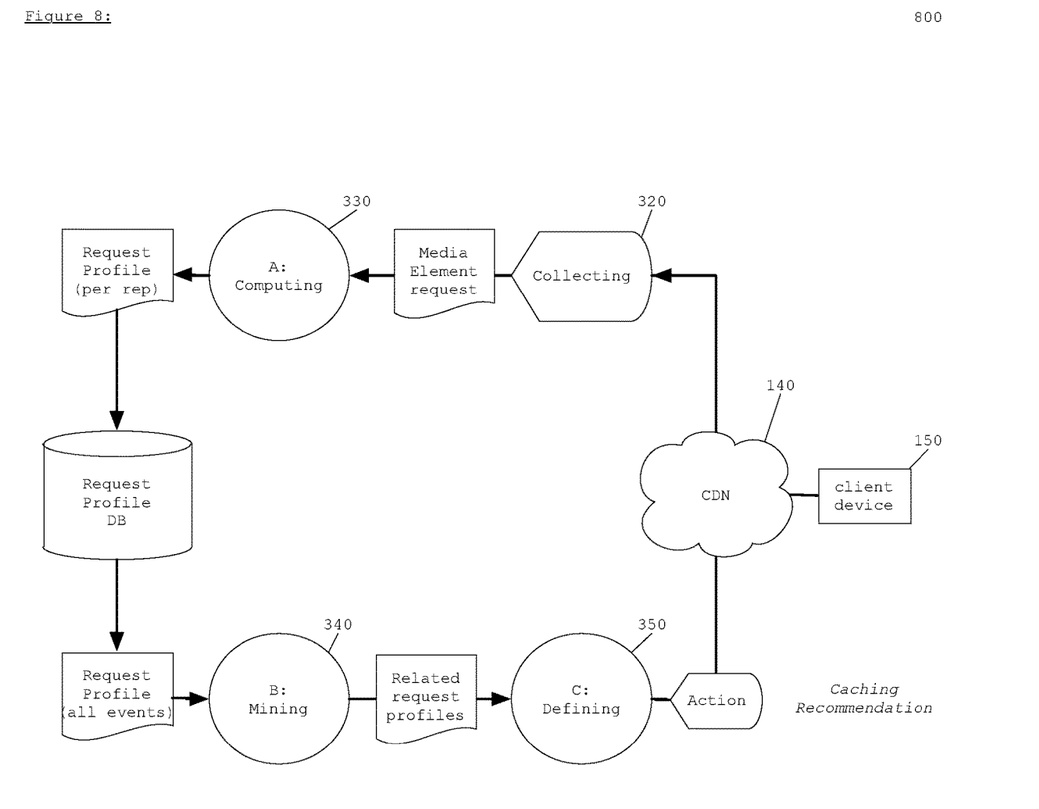
FIG. 8 defines an exemplary embodiment of the decision process that leads to the definition of the caching requirements.

FIG. 8 shows a flow chart 800 representing the information flow to and from the CDN 140 and the CRE 160 in an exemplary embodiment. In the flow chart media element requests are collected 320 (over a period of time) and a request profile is computed on a per event representation basis (so the request profile is for each representation of each event in one embodiment) and stored 330. A mining process 340 retrieves the request profiles and filters the profiles related to the current collection interval and event. The filtered profiles are aggregated across all events and provided as inputs to a defining process 350 that generates updated caching recommendations to be applied to all media elements delivered to CDN 140 for the current collection interval.

Figure 9:
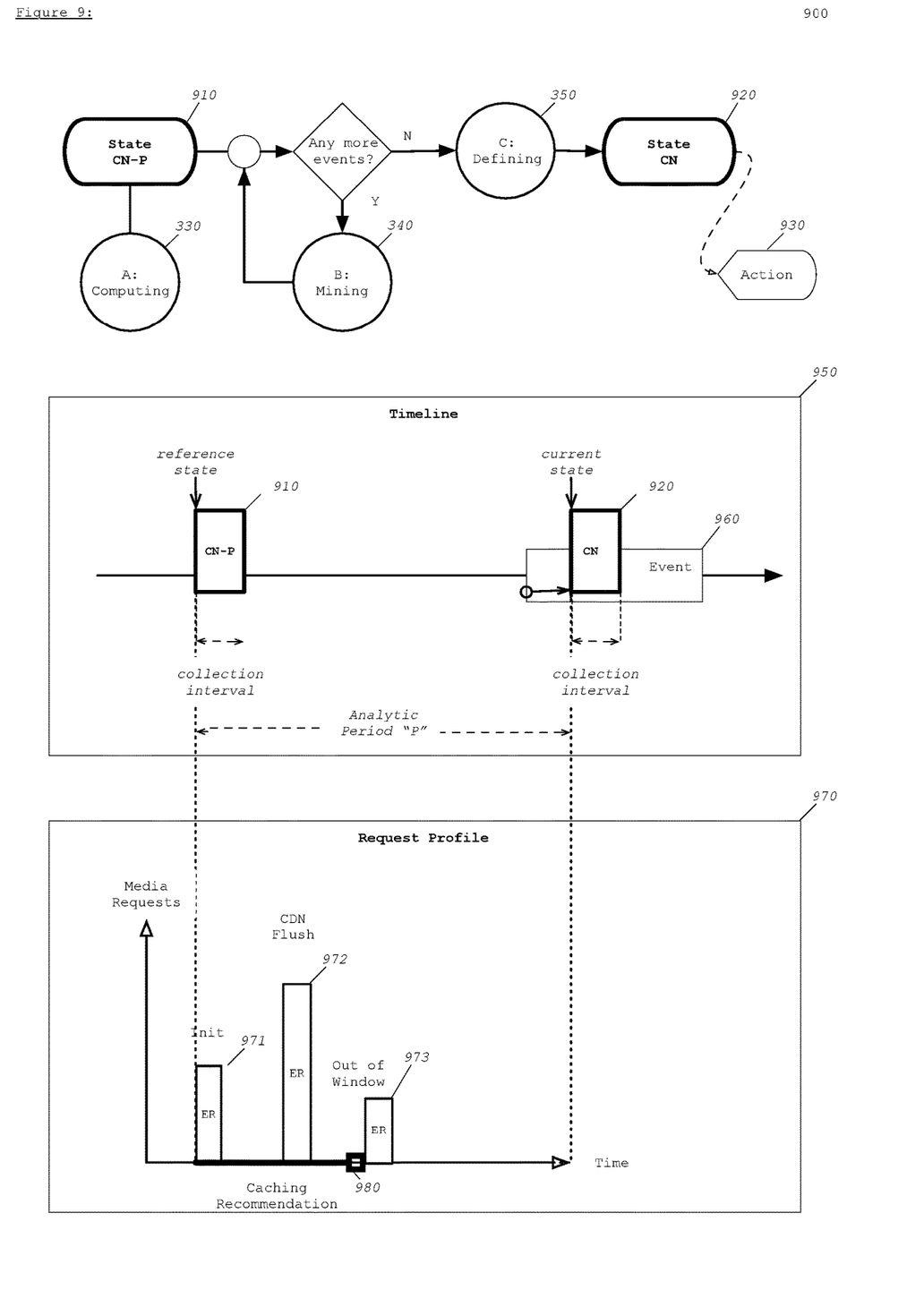
FIG. 9 defines an exemplary embodiment of current state, past action and mined profiles involved in the definition of the next caching recommendation actions.

FIG. 9 shows a block diagram 900 detailing the timelines involved in the state transitions of an exemplary embodiment of a CRE. In one aspect of the embodiment, for the duration of a reference collection interval the system is in state CN-P 910. During the reference collection interval, a computing process 330 can collect request profiles and a mining process 340 can process event profiles for all of the events.

In another aspect of the embodiment, in order to generate an updated definition of the caching recommendations for the current collection interval (CN) 920, the CRE takes into account the caching recommendations issued one Analytic Period ago in the reference collection interval (CN-P) 910 and takes into account the overall delivery performance of the media elements delivered to the CDN one Analytic Period ago in the reference collection interval during which the recommendations (CN-P) applied, analyzed per event representation over one Analytic Period. A defining process 350 in one embodiment computes a reward based on the mined profiles and the previous state. The system transits to a new "state CN" 920 and produces a new action 930 which can include new caching recommendation on a per event representation basis, and the new caching recommendation can be transmitted to the CDN when a media element in the current collection interval is requested.

In another aspect of the embodiment, a timeline 950 indicates the relationship in time between a "reference state" CN-P 910 and a "current state" CN 920. The time span between 910 and 920 corresponds to an "Analytic Period" (such as one week). The newly generated caching instructions will only apply, in one embodiment, to media element requests for the events that are currently airing and been recorded 960. Media elements for older events that may be requested during the current Collection Interval will continue to be delivered with the caching recommendations that were set during the last Collection Interval of the older event, while it was still being recorded.

In another aspect of the embodiment, the overall CDN behavior consists of one Request Profile 970 per requested representation of each event that was recorded during the reference Collection Interval. Request Profiles 970 are generated by mining the data collected by the Computing process 330 with the goal to only select per event representation the information related to requests of media elements recorded during the reference Collection Interval.

In another aspect of the embodiment, the Request Profile 970 may show initial media requests 971 that occur immediately after a media element was recorded, and media requests 972 that occur while the caching recommendation 980 for the analyzed media elements issued to the CDN was still valid, and as such indicate an undesired CDN flush operation. Other media requests 973 that occur "out of window" indicate that the caching recommendation was insufficient to address actual content demand over time.

Figure 10:
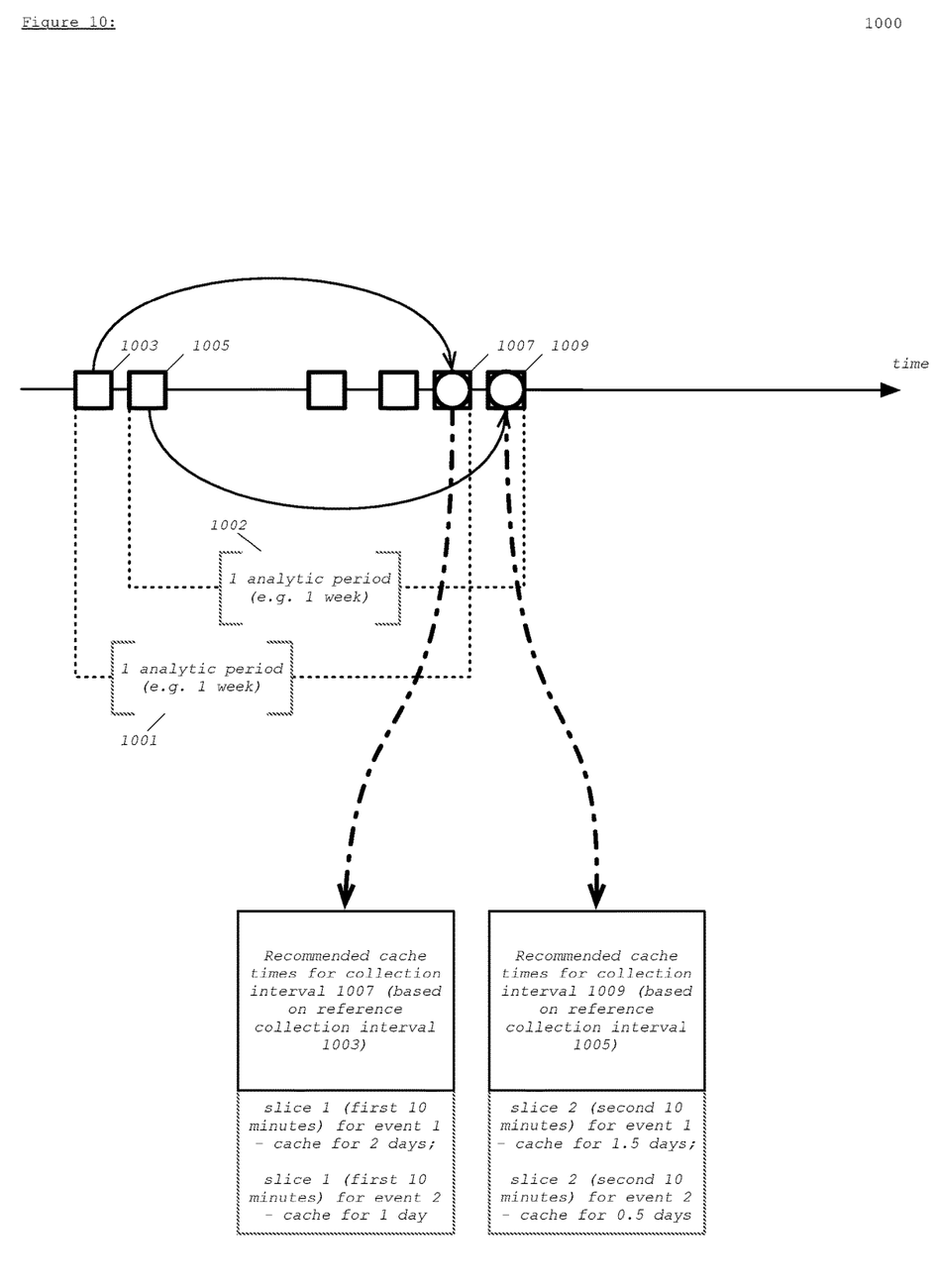
FIG. 10 shows an example of a CRE embodiment that uses collection intervals over analytic periods to derive new caching recommendations

FIG. 10 shows a set of collection intervals along a time line, and the definition of the reference collection interval for two analytic periods 1001 and 1002, one collection interval apart. In one embodiment, an analytic period can be a period of time, such as one week, that is based on a predetermined schedule of a repeating cycle of programs or content such as TV shows and other content that are scheduled to repeat every week (e.g. a TV show is broadcast for each and every week—until cancelled or otherwise changed when the schedule changes). The one-week analytic period can capture the periodicity of both daily and weekly consumption patterns. The analytic period can be set to be shorter or longer than one week. In one embodiment, each collection interval can be a period of time that is used to capture requests for media elements for only a portion of a typical event (e.g. only 10 minutes of a 60-minute TV show) and thus the collection interval represents data for a slice of time of each event in most cases. When the analytic period is one week, and the collection interval is 10 minutes, the analytic period includes 1,008 collection intervals; FIG. 10 shows only a subset of collection intervals within an analytic period in one embodiment in order to simplify the drawing. Each collection interval in the set of collection intervals is associated with data about requests for media elements from the CDN (or a set of a plurality of CDNs), and the CRE collects these requests and then generates request profiles one for each event representation so each event representation has its own request profile about requests from the CDN for media elements in only that event representation). Hence, each collection interval can be associated with a request profile for each event representation that was requested during the time slice of the collection interval.

FIG. 10 shows how a CRE uses data associated with collection intervals and one or more methods described herein to generate new caching recommendations. For example, methods described in conjunction with FIGS. 3, 8, and 9 can be used to generate new caching recommendations based on mined data from all collection intervals of the analytic period that include requests of media elements recorded during the reference collection interval, and the caching recommendations issued during the reference collection intervals for these media elements. Collection interval 1003 in analytic period 1001 is a reference collection interval for collection interval 1007 (in analytic period 1002) when collection interval 1007 was the current collection interval, and collection interval 1005 is a reference collection interval for collection interval 1009 when collection interval 1009 is the current collection interval. In the example shown in FIG. 10, collection intervals 1003 and 1007 are the first and last (respectively) collection intervals in analytic period 1001, and collection intervals 1005 and 1009 are the first and last (respectively) collection intervals in analytic period 1002. The CRE mines data from analytic period 1001 related to media elements recorded during collection interval 1003 and uses the caching recommendation issued during interval 1003 to generate a new caching recommendation for collection interval 1007, and an example of this new caching recommendation is shown in FIG. 10 as 2 days for slice 1 of event 1 (which is the first 10 minutes of event 1) and 1 day for slice 1 of event 2 (which is the first 10 minutes of event 2 that is a program or other content that is different than event 1). The CRE mines data from analytic period 1002 related to media elements recorded during collection interval 1005 and uses the caching recommendation issued during interval 1005 to generate a new caching recommendation for collection interval 1009. It can be seen from FIG. 10 that different slices of the same event can have different caching recommendations. Moreover, over time across multiple analytic periods, the same slice of the same event (e.g. the first 10 minutes of an event) can have different caching recommendations as the CRE learns the CDN's behavior and modifies the caching recommendations. Also, different representations (e.g. standard definition and high definition) of the same event are analyzed separately and can have different caching recommendations as the CRE learns the CDN's behavior for the different representations.

Figure 11:
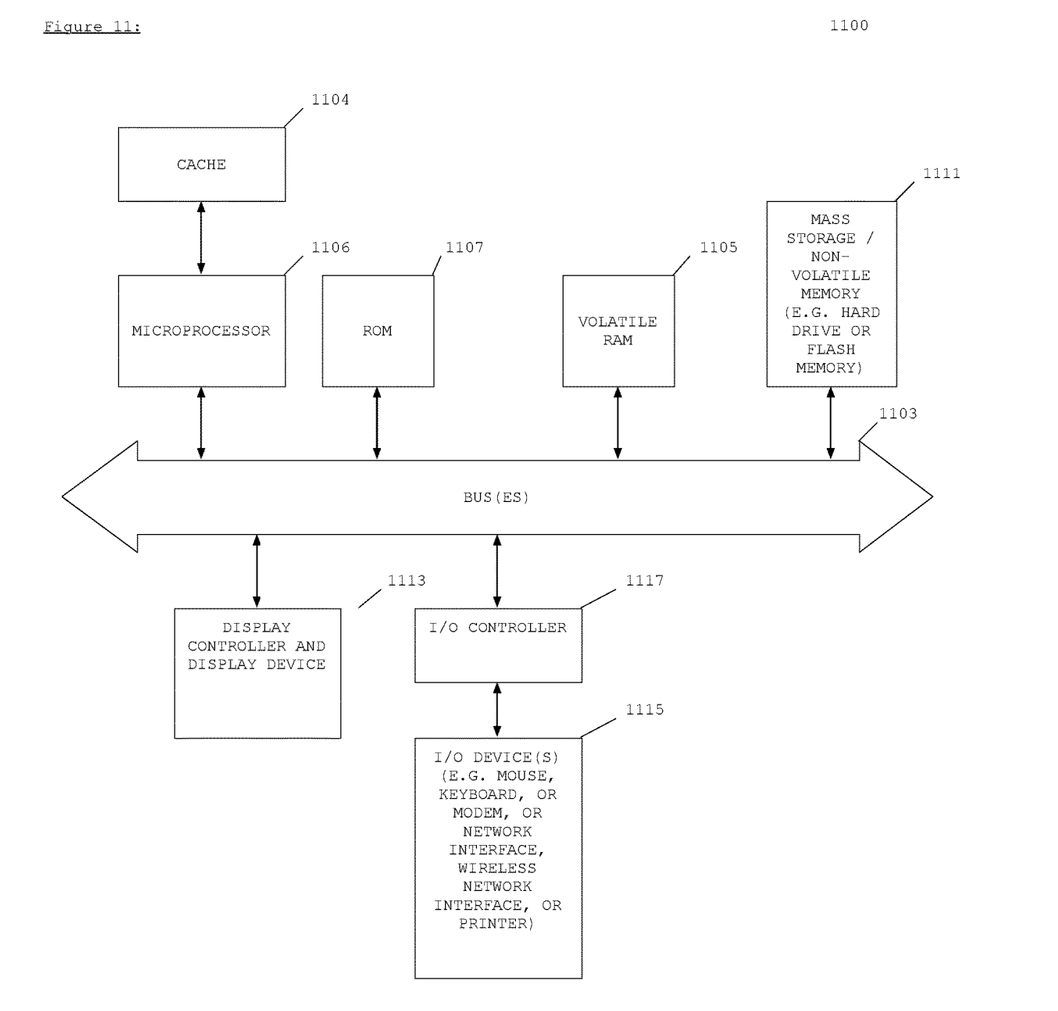
FIG. 11 shows an example of a data processing system that can be used to implement one or more caching recommendation engines; in one embodiment, a server farm can include a plurality of the systems shown in FIG. 11 to provide one or more caching recommendation engines.

FIG. 11 shows one example of a data processing system, which may be used as any one of the nodes in any one of the embodiments described herein. Note that while FIG. 11 illustrates various components of a data processing system, it is not intended to represent any particular architecture or manner of interconnecting the components as such details are not germane to this description. It will also be appreciated that other data processing systems which have fewer components or perhaps more components than those shown in FIG. 11 may also be used with one or more embodiments described herein.

As shown in FIG. 11, the system 1100, which is a form of a data processing system, includes one or more buses 1103 which is coupled to one or more microprocessor(s) 1106 and a ROM (Read Only Memory) 1107 and volatile RAM 1105 and a non-volatile memory 1111. The one or more processors can be coupled to optional cache 1104. The one or more microprocessors 1106 may retrieve the stored instructions from one or more of the memories 1107, 1105 and 1111 and execute the instructions to perform operations described above. These memories represent examples of machine readable non-transitory storage media that can store or contain computer program instructions which when executed cause a data processing system to perform the one or more methods described herein thereby causing the system 1100 to operate like any one of the nodes described herein. The bus 1103 interconnects these various components together and also interconnects these components 1106, 1107, 1105 and 1111 to an optional display controller and display device 1113 and to optional peripheral devices such as input/output (I/O) devices 1115 which may be one or more of mice, touch screens, touch pads, touch sensitive input devices, keyboards, modems, network interfaces, printers and other devices which are well known in the art. Typically, the input/output devices 1115 are coupled to the system through input/output controllers 1117. The volatile RAM (Random Access Memory) 1105 is typically implemented as dynamic RAM (DRAM), which requires power continually in order to refresh or maintain the data in the memory.

The mass storage 1111 is typically a magnetic hard drive or a flash memory or other types of memory system (or a combination of systems) which maintain data (e.g., large amounts of data) even after power is removed from the system. Typically, the mass storage 1111 will also be a random-access memory although this is not required. The mass storage 1111 can be used to provide storage for the database 131. The mass storage 1111 can thus be used to store the request profiles for the media element files and their metadata. While FIG. 11 shows that the mass storage 1111 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

What is claimed is:

1. A method for improving the cache performance of a content distribution network (CDN), by learning the behavior of the CDN and controlling the CDN with updated parameters based on the learned behavior, the method comprising:
   a) computing for each event representation, a request profile representative of collected media element requests to a Content Origination system (COS) received from a CDN and recording the request profile for future use;
   b) mining for a current collection interval and for each event representation, all the recorded request profiles that relate to content requested during a reference collection interval that occurred one analytic period ago relative to the current collection interval;
   c) defining an new caching recommendation on a per event and per representation basis for the current collection interval, where the new caching recommendation is calculated based on the caching recommendation per event and per representation issued during the reference collection interval, and on the mined data to statistically reduce the number of repeated requests by the CDN of the same media elements; and utilizing machine learning techniques to model the CDN behavior based on the mining of the request profiles to differentiate primary requests from requests after CDN expiration and requests after a CDN flush of the media elements issued during the reference collection interval of an analytic period.

2. The method as in claim 1, wherein the method further comprises: storing the request profiles as histograms of requests vs. time and wherein each event is a live event recorded and delivered concurrently at the same time, and wherein each event is delivered in a plurality of different representations.

3. The method as in claim 1, wherein the method further comprises: transmitting, in response to a request for a media element of a first event representation, the new caching recommendation for the first event representation to the CDN along with the media element.

4. The method as in claim 3 wherein the defining is performed repeatedly over time and the transmitting is performed repeatedly over time.

5. The method as in claim 2, wherein the method further comprises: receiving live content from different channels of live streaming media; storing the live content from each channel in media elements which are a small fraction of time of the content.

6. The method as in claim 5, wherein the storing includes recording each of live video streams in the live content on a plurality of nodes of a cluster of interconnected, autonomous live on demand nodes, wherein each media element is concurrently replicated on one or more live on demand nodes.

7. The method as in claim 1 wherein the analytic period is a period of time that is based on a predetermined repeating schedule for broadcasting of content.

8. The method as in claim 7 wherein the analytic period is one of a week or a day.

9. The method as in claim 7 wherein the computing, the mining and the defining are performed by a caching recommendation engine (CRE), and the CRE continuously collects request profiles for each collection interval of each event representation, and the CRE uses the collected request profiles to define new caching recommendations over time for each event representation in order to continuously adapt to varying demand patterns and varying CDN performance.

10. The method as in claim 9 wherein a first analytic period for a first event representation defines, when mined, a first caching recommendation for media elements of the first event representation requested in the first collection interval and wherein a second collection interval for the first event representation defines, when mined, a second caching recommendation for media elements of the first event representation in the second collection interval and wherein the first caching recommendation and the second caching recommendation are different.

11. The method as in claim 10 wherein the first collection interval is a first time slice that is a first portion of time of the first event representation and the second collection interval is a second time slice that is a second portion of time of the first event representation.

12. A method for improving the cache performance of a content distribution network (CDN) by learning the behavior of the CDN, the method comprising: computing for each event representation a request profile that is representative of collected media element requests to a Content Origination System (COS) received from the CDN and recording the request profile; mining for each event representation all recorded request profiles that relate to media elements requested during a prior analytic period; defining a new caching recommendation on a per event representation basis for use during a current analytic period wherein the new caching recommendation is based on a prior caching recommendation for each corresponding event representation used during the prior analytic period and the mined data to reduce the number of repeated CDN requests of the same media elements; and utilizing machine learning techniques to model the CDN behavior based on the mining of the request profiles to differentiate primary requests from requests after CDN expiration and requests after a CDN flush of the media elements issued during a reference collection interval of an analytic period.

13. One or more non-transitory machine readable media having executable instructions which when executed by one or more data processing systems cause the one or more data processing systems to perform a method for improving the cache performance of a content distribution network (CDN), by learning the behavior of the CDN and controlling the CDN with updated parameters based on the learned behavior, the method comprising:

a) computing for each event representation, a request profile representative of collected media element requests to a Content Origination system (COS) received from a CDN and recording the request profile for future use;

b) mining for a current collection interval and for each event representation, all the recorded request profiles that relate to content requested during a reference collection interval that occurred one analytic period ago relative to the current collection interval;

c) defining an new caching recommendation on a per event and per representation basis for the current collection interval, where the new caching recommendation is calculated based on the caching recommendation per event and per representation issued during the reference collection interval, and on the mined data to statistically reduce the number of repeated requests by the CDN of the same media elements; and utilizing machine learning techniques to model the CDN behavior based on the mining of the request profiles to differentiate primary requests from requests after CDN expiration and requests after a CDN flush of the media elements issued during the reference collection interval of an analytic period.

14. The one or more media as in claim 13, wherein the method further comprises: storing the request profiles as histograms of requests vs. time and wherein each event is a live event recorded and delivered concurrently at the same time, and wherein each event is delivered in a plurality of different representations.

15. The one or more media as in claim 13, wherein the method further comprises: transmitting, in response to a request for a media element of a first event representation, the new caching recommendation for the first event representation to the CDN along with the media element.

16. The one or more media as in claim 15 wherein the defining is performed repeatedly over time and the transmitting is performed repeatedly over time.

17. The one or more media as in claim 14, wherein the method further comprises: receiving live content from different channels of live streaming media; storing the live content from each channel in media elements which are a small fraction of time of the content and wherein the storing includes recording each of live video streams in the live content on a plurality of nodes of a cluster of interconnected, autonomous live on demand nodes, wherein each media element is concurrently replicated on one or more live on demand nodes.

18. The one or more media as in claim 13 wherein the analytic period is a period of time that is based on a predetermined repeating schedule for broadcasting of content.

19. The one or more media as in claim 18 wherein the computing, the mining and the defining are performed by a caching recommendation engine (CRE), and the CRE continuously collects request profiles for each collection interval of each event representation, and the CRE uses the collected request profiles to define new caching recommendations over time for each event representation in order to continuously adapt to varying demand patterns and varying CDN performance.

20. The one or more media as in claim 19 wherein a first analytic period for a first event representation defines, when mined, a first caching recommendation for media elements of the first event representation requested in the first collection interval and wherein a second collection interval for the first event representation defines, when mined, a second caching recommendation for media elements of the first event representation in the second collection interval and wherein the first caching recommendation and the second caching recommendation are different.

21. The one or more media as in claim 20 wherein the first collection interval is a first time slice that is a first portion of time of the first event representation and the second collection interval is a second time slice that is a second portion of time of the first event representation.

22. One or more non-transitory machine readable media having executable instructions which when executed by one or more data processing systems cause the one or more data processing systems to perform a method for improving the cache performance of a content distribution network (CDN) by learning the behavior of the CDN, the method comprising: computing for each event representation a request profile that is representative of collected media element requests to a Content Origination System (COS) received from the CDN and recording the request profile; mining for each event representation all recorded request profiles that relate to media elements requested during a prior analytic period; defining a new caching recommendation on a per event representation basis for use during a current analytic period wherein the new caching recommendation is based on a prior caching recommendation for each corresponding event representation used during the prior analytic period and the mined data to reduce the number of repeated CDN requests of the same media elements; and utilizing machine learning techniques to model the CDN behavior based on the mining of the request profiles to differentiate primary requests from requests after CDN expiration and requests after a CDN flush of the media elements issued during a reference collection interval of an analytic period.

* * * * *